Patented Jan. 1, 1946

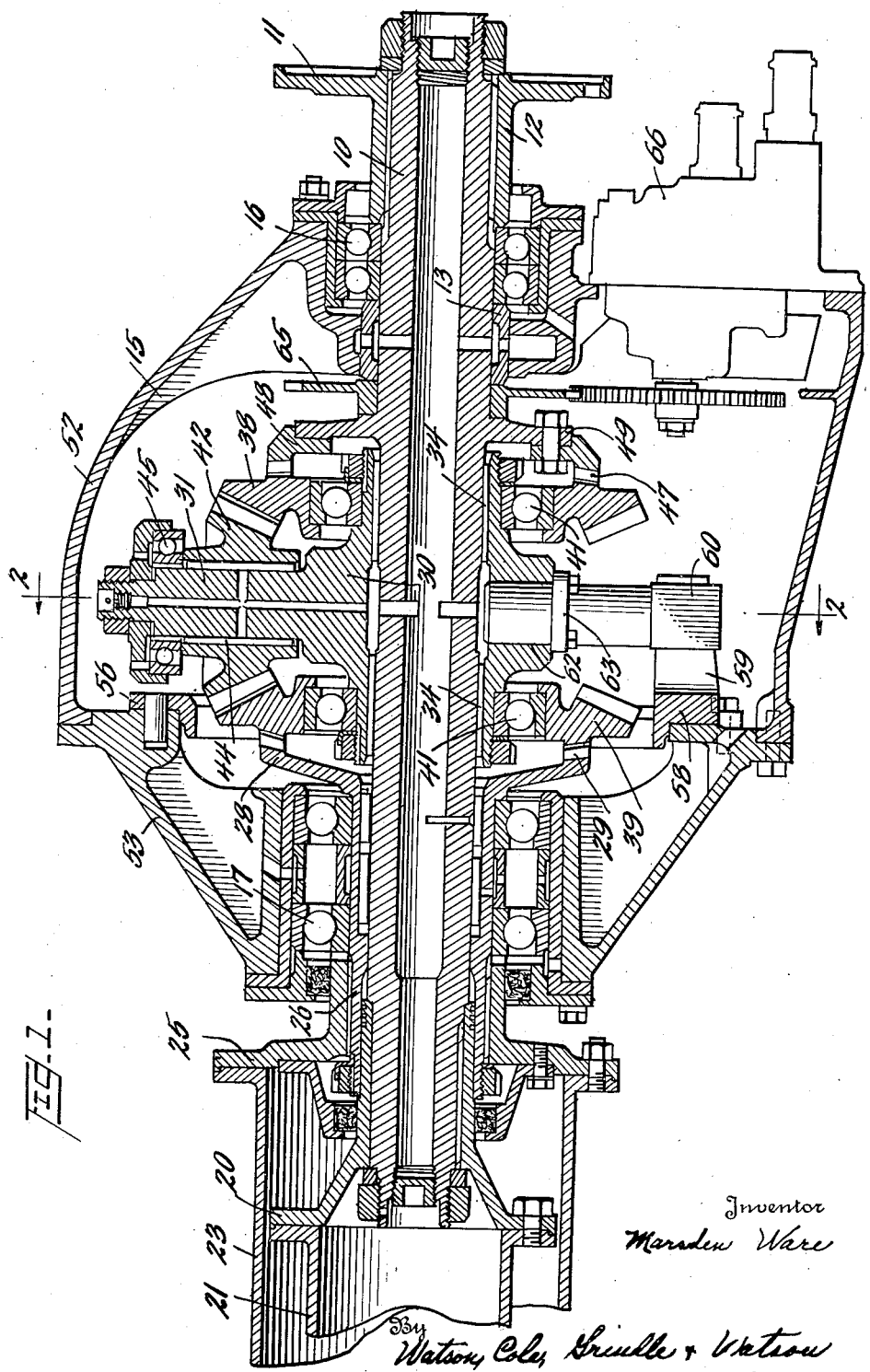

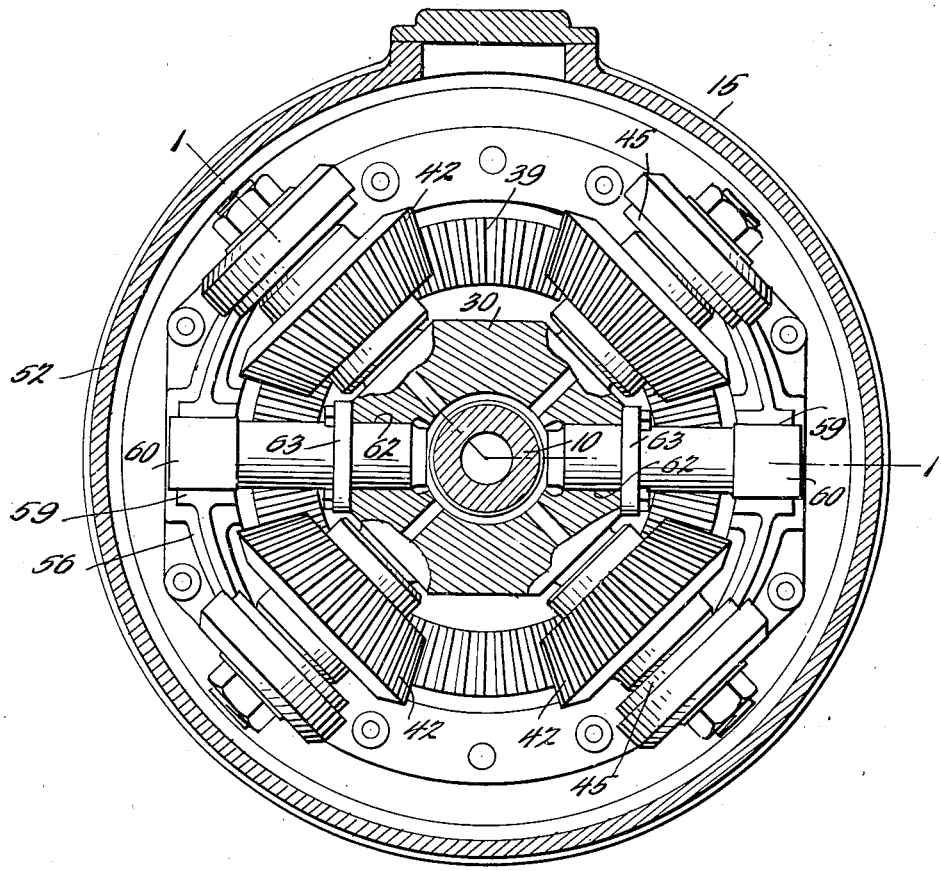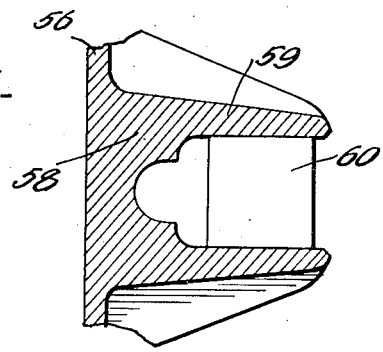

2,392,015

UNITED STATES PATENT OFFICE 2,392,015

MULTIPLE DRIVING UNIT

Marsden Ware, Huntington Woods, Mich., assignor to Packard Motor Car Company, Detroit, Mich., a corporation of Michigan Application March 31, 1944, Serial No. 528,897

11 Claims. (Cl. 74—389)

This invention relates to gearing and has for an object the provision of a compact driving unit for effecting rotation in opposite directions of a pair of concentric driven elements from a single drive shaft. The invention finds its principal use in imparting rotation in opposite direction to a pair of coaxial propellers, for example in the propulsion of marine craft or aircraft.

More particularly, it is an object of the invention to provide a simple and readily assembled unit for driving two concentric shafts in opposite directions from a single coaxially disposed drive shaft. A feature of the invention is the provision of means whereby the reverse gearing interposed between the drive shaft and one of the concentric driven shafts may be assembled as a separate unit, journalled on the drive shaft, and coupled to the latter and to the driven concentric shaft by toothed couplings engageable by axial displacement, whereby assembly of the unit in a suitable housing is facilitated and the maintenance of the gears in proper meshing relation is assured.

It is a further object of the invention to provide, in a unit of the type described, reverse bevel gearing including driving and driven gears and one or more interposed idler gears, all of the gears being supported for rotation on a carrier which may in turn be journalled on the drive shaft, together with means rendered effective to retain the carrier against rotation when the parts are assembled in operative relation in a housing for the gearing.

Further objects and features of the invention will be apparent from the following description taken in connection with the accompanying drawings in which Figure 1 is a longitudinal sectional view through a driving unit embodying the principles of the invention, the section being taken substantially on the line 1—1 of Figure 2;

Figure 2 is a transverse sectional view on the line 2—2 of Figure 1; and

Figure 3 is a fragmentary sectional view of parts which cooperate to retain the gear carrier against rotation.

In order to facilitate the description of the invention and to promote an understanding of its principles, the invention is illustrated by a specific and preferred embodiment thereof. It will nevertheless be appreciated that various alterations and further modifications of the illustrated structure are contemplated such as fall within the scope of the invention and especially within the scope of the claims appended hereto.

A drive shaft 10, which may be connected to a source of power through the coupling plate 11, extends through a housing 15 and is journalled for rotation therein by suitable bearings 16 and 17 disposed at opposite ends of the housing. At its rear end, the drive shaft 10 is directly connected through coupling element 20 with a shaft 21 on which may be mounted a driven element, for example, a propeller (not shown). Surrounding the propeller shaft 21 and concentric therewith is a second shaft 23 on which may be mounted a second propeller (not shown) forward of the first propeller. The second propeller shaft 23 is connected through a suitable coupling element 25 to a sleeve 26, the latter being journalled on the drive shaft 10 and within the bearings 17, and carrying at its forward end a toothed coupling element 28 provided with axially directed teeth 29. Reversing gearing is interposed between the drive shaft 10 and the coupling element 28, so as to impart reverse rotation to the element and thereby to the propeller shaft 23.

This reversing gearing preferably includes a carrier 30 having a hub portion and one or more radially directed spindles 31, four such spindles being illustrated, as shown in Figure 2. The hub portion of the carrier 30 is journalled on the drive shaft 10 by needle bearings 34. A first bevel gear 38 and a second bevel gear 39 are journalled on the carrier 30 at opposite ends of the carrier hub by bearings 41; one or more idler gears 42, four being illustrated, are journalled on the spindles 31 in meshing relation with the gears 38 and 39 by needle bearings 44, being retained against outward displacement on the spindles by thrust bearings 45. Since the bearings 41 by means of which the gears 38 and 39 are journalled on the carrier 30 also function as thrust bearings, it will be perceived that the gearing train constitutes a complete and separate unit, the gears being retained in proper meshing relation on the carrier 30 independently of any other elements of the complete driving unit. The gear 39 is provided on its rearward face with axially directed teeth adapted for coupling engagement with the teeth 29 on the plate 28. The gear 38 is similarly provided on its forward face with axially directed teeth adapted for coupling engagement with teeth 47 formed on an annulus 48 which is secured to a flange 49 on the drive shaft 10. These cooperating coupling teeth are shaped to engage somewhat loosely so as to facilitate assembly of the driving unit and to compensate for slight misalignment of the several elements of the unit.

Thus the housing 15 may be formed in two parts 52 and 53 which are bolted or otherwise secured together when the assembly is completed. The forward portion 52 of the housing 15 receives the forward end of the shaft 10, the shaft being retained therein against axial displacement by the coupling plate 11 and its sleeve 12, and by gear 65 and spacing sleeve 13, the sleeves 12 and 13 abutting the bearings 16 which function as thrust bearings to position the shaft. The gear unit, assembled with the reverse gears in meshing relation on the carrier 30 as hereinbefore described, is then assembled on the shaft 10 with the coupling teeth on the forward face of the gear 38 in operative engagement with the shaft carried teeth 47. The coupling element 28 is then assembled in the rearward portion 53 of the housing 15 and is positioned on the rear end of the shaft 10 with the teeth 29 in cooperative relation with the teeth on the rear face of the gear 39. The propeller shafts 21 and 23 may then be readily secured respectively to the coupling elements 20 and 25, so that the propeller shaft 21 may be driven directly from the drive shaft 10, and the propeller shaft 23 may be driven in a reverse direction through the bevel gear train when carrier 30 is held against rotation.

In order to prevent rotation of carrier 30 when the latter is properly assembled in the housing 15, an annular member 56 may be secured to the forward face of the rear section 53 of the housing. The member 56 is provided with one or more bosses 58, shown more particularly in Figure 3, each boss 58 being bifurcated to provide a fork 59 within which is received an anchoring element 60. Each anchoring element 60 is received in a socket 62 formed in the hub portion of the carrier 30 and is provided with a flange 63 which is bolted to the hub portion to secure the element in position. It will be observed that as the rear section 53 of the housing 15 is slid on the rearward end of the shaft 10, the anchoring elements 60, if properly positioned initially, are embraced by the forks 59 of the bosses 58, so that the carrier 30 is effectively retained against rotation merely by axial displacement of the parts into the assembled relation.

The gear 65, keyed on the shaft 10, may be employed to drive a pump 66 or other auxiliary equipment.

It is sometimes desirable to provide a gear train affording other than a one to one ratio, for instance for the purpose of driving the rear propeller somewhat faster than the front propeller. This may be readily accomplished by employing gears 38 and 39 of different pitch diameter and inclining the spindles 31 either forwardly or rearwardly at such an angle to the axis of shaft 10 as to provide proper meshing relation of the gears of the reverse train.

Having thus described the invention, what is claimed as new and desired to be secured by Letters Patent is:

1. In a driving unit for marine craft employing concentric propeller shafts, the combination with a drive shaft coaxial with the propeller shafts, of a coupling connecting said drive shaft with one of said propeller shafts for unitary rotation, and means including reverse bevel gearing connecting said drive shaft with the other of said propeller shafts, said means including a first bevel gear coaxial with said drive shaft, a toothed coupling connecting said first bevel gear with said drive shaft, a second bevel gear coaxial with said drive shaft, a toothed coupling connecting said second bevel gear with said other of said propeller shafts, a carrier mounted on said drive shaft, at least one bevel pinion rotatably supported on said carrier and meshing with said first and second bevel gears, means retaining said carrier against rotation, and bearings journalling said first and second bevel gears on said carrier.

2. In a driving unit for concentric propeller shafts, the combination with a drive shaft coaxial with the propeller shafts, of a direct coupling between said drive shaft and one of said propeller shafts, and means including reverse bevel gearing connecting said drive shaft with the other of said propeller shafts, said means including a first bevel gear coaxial with and rotatable by said drive shaft, a second bevel gear coaxial with said drive shaft and rotatable with said other of said propeller shafts, a carrier mounted on said drive shaft, at least one bevel pinion rotatably supported on said carrier and meshing with said first and second bevel gears, means retaining said carrier against rotation, and means journalling said first and second bevel gears on said carrier.

3. In a driving unit for concentric propeller shafts, the combination with a drive shaft coaxial with the propeller shafts, of a direct coupling between said drive shaft and one of said propeller shafts, and means including reverse bevel gearing connecting said drive shaft with the other of said propeller shafts, said means including a first bevel gear coaxial with and rotatable by said drive shaft, a second bevel gear coaxial with said drive shaft and rotatable with said other of said propeller shafts, a carrier mounted on the axis of said drive shaft, at least one bevel pinion rotatably supported on said carrier and meshing with said first and second bevel gears, and means retaining said carrier against rotation, whereby said propeller shafts are rotated in opposite directions by said drive shaft.

4. In a driving unit for concentric propeller shafts, the combination with a drive shaft coaxial with the propeller shafts, of a direct coupling between said drive shaft and one of said propeller shafts, and means including reverse bevel gearing connecting said drive shaft with the other of said propeller shafts, said means including a first bevel gear coaxial with and rotatable by said drive shaft, a second bevel gear coaxial with said drive shaft and rotatable with said other of said propeller shafts, a carrier mounted on the axis of said drive shaft, at least one bevel pinion rotatably supported on said carrier and meshing with said first and second bevel gears, a housing for said unit, and cooperating members on said housing and carrier for retaining the latter against rotation, said members being engageable on endwise assembling movement of said carrier into said housing.

5. In a driving unit for concentric propeller shafts, the combination with a drive shaft coaxial with the propeller shafts, of a coupling connecting said drive shaft with one of said propeller shafts for unitary rotation, and means including reverse bevel gearing connecting said drive shaft wtih the other of said propeller shafts, said means including a first bevel gear coaxial with said drive shaft, a toothed coupling connecting said first bevel gear with said drive shaft, a second bevel gear coaxial with said drive shaft, a toothed coupling connecting said second bevel gear with said other of said propeller shafts, a carrier mounted on the axis of said drive shaft, at least one bevel pinion rotatably supported on said carrier and meshing with said first and second bevel gears, a housing for said unit, and cooperating members on said housing and carrier for retaining the latter against rotation, said members being engageable on endwise assembling movement of said carrier into said housing.

6. In a driving unit for concentric propeller shafts, the combination with a rive shaft coaxial with the propeller shafts, of a coupling connecting said drive shaft with one of said propeller shafts for unitary rotation, and means including reverse bevel gearing connecting said drive shaft with the other of said propeller shafts, said means including a first bevel gear coaxial with said drive shaft, a toothed coupling connecting said first bevel gear with said drive shaft, a second bevel gear coaxial with said drive shaft, a toothed coupling connecting said second bevel gear with said other of said propeller shafts, a carrier mounted on said drive shaft, at least one bevel pinion rotatably supported on said carrier and meshing with said first and second bevel gears, bearings journalling said first and second bevel gears on said carrier, a housing for said unit, and cooperating members on said housing and carrier for retaining the latter against rotation, said members being engageable on endwise assembling movement of said carrier into said housing.

7. In a driving unit for concentric driven elements, the combination with a housing for said unit and a drive shaft journalled in said housing, of a direct coupling between said drive shaft and one of said driven elements and means including reverse bevel gearing connecting said drive shaft with the other of said driven elements, said means including a first bevel gear coaxial with and rotatable by said drive shaft, a second bevel gear coaxial with said drive shaft and rotatable with said other of said driven elements, a carrier mounted on the axis of said drive shaft, at least one bevel pinion rotatably supported on said carrier and meshing with said first and second bevel gears, and means connecting said carrier and said housing for retaining said carrier against rotation.

8. In a driving unit for concentric driven elements, the combination with a housing for said unit and a drive shaft journalled in said housing, of a coupling connecting said drive shaft with one of said driven elements for unitary rotation, and means within said housing, including reverse bevel gearing, connecting said drive shaft with the other of said driven elements, said means including a first bevel gear coaxial with and coupled with said drive shaft, a second bevel gear coaxial with said drive shaft, a coupling connecting said second bevel gear with said other of said driven elements, a carrier mounted on said drive shaft, at least one bevel pinion rotatably supported on said carrier and meshing with said first and second bevel gears, means connecting said housing and carrier retaining said carrier against rotation, and bearings journalling said first and second bevel gears on said carrier.

9. In a driving unit for concentric propeller shafts, the combination with a drive shaft coaxial with the propeller shafts, of a direct coupling between said drive shaft and one of said propeller shafts, and means including reverse bevel gearing connecting said drive shaft with the other of said propeller shafts, said means including a first bevel gear coaxial with and rotatable by said drive shaft, a second bevel gear coaxial with said drive shaft and rotatable with said other of said propeller shafts, a carrier mounted on the axis of said drive shaft, a plurality of bevel pinions rotatably supported on said carrier and meshing with said first and second bevel gears, and means retaining said carrier against rotation, said last means including a housing for said gearing, elements projecting radially from said carrier, and means projecting axially from said housing for embracing said elements when said housing and gearing are assembled by relative axial displacement.

10. In a driving unit employing concentric propeller shafts, the combination with a drive shaft coaxial with the propeller shafts, of a coupling connecting said drive shaft with one of said propeller shafts for unitary rotation, and means including reverse bevel gearing connecting said drive shaft with the other of said propeller shafts, said means including a first bevel gear coaxial with said drive shaft, a toothed coupling connecting said first bevel gear with said drive shaft, a second bevel gear coaxial with said drive shaft, a toothed coupling connecting said second bevel gear with said other of said propeller shafts, a carrier mounted on said drive shaft, at least one bevel pinion rotatably supported on said carrier and meshing with said first and second bevel gears, bearings journalling said first and second bevel gears on said carrier, a housing formed in two sections adapted to be connected in a plane transverse to the axis of the drive shaft, and means carried by one of said housing sections and engageable with said carrier on axial assembly of said gearing in such housing section to retain said carrier against rotation.

11. In a driving unit for multiple driven shafts, the combination with a drive shaft coaxial with the driven shafts, of a direct coupling between said drive shaft and one of said driven shafts, and means including reverse bevel gearing connecting said drive shaft with the other of said driven shafts, said means including a first bevel gear coaxial with and rotatable by said drive shaft, a second bevel gear coaxial with said drive shaft and rotatable with said other of said drive shafts, a carrier mounted on the axis of said drive shaft, at least one bevel pinion rotatably supported on said carrier and meshing with said first and second bevel gears, a housing formed in two sections adapted to be connected in a plane transverse to the axis of the drive shaft, and means carried by one of said housing sections and engageable with said carrier on axial assembly of said gearing in such housing section to retain said carrier against rotation.

MARSDEN WARE.